Oct. 6, 1925.

W. A. WATERMAN

ORCHARD VALVE

Original Filed Aug. 6, 1923

1,556,551

Inventor
William A. Waterman
by Nestall and Wallace
his Attorneys

Patented Oct. 6, 1925.

1,556,551

UNITED STATES PATENT OFFICE.

WILLIAM A. WATERMAN, OF EXETER, CALIFORNIA.

ORCHARD VALVE.

Application filed August 6, 1923, Serial No. 656,091. Renewed June 30, 1925.

*To all whom it may concern:*

Be it known that I, WILLIAM A. WATERMAN, a citizen of the United States, and resident of Exeter, in the county of Tulare, State of California, have invented new and useful Improvements in an Orchard Valve, of which the following is a specification.

This invention relates to a valve structure especially adaptable for irrigating systems wherein it is desired to control the outflow of water from a pipe or other duct.

In irrigating systems employing conduit and pipe, it is the common practice to install valves controlling the outflow of water. As these valves are exposed to the weather, and as the water is not clean but carries said, grit, trash and other foreign matter, it is difficult to maintain the valve covers water tight on their seats. Packing soon wears away due to the grit, sand, and dirt and hardens with the weather and age. Such a valve is usually maintained closed for long intervals of time and open for comparatively short periods. For this reason the valve should be simple in structure, economical to manufacture and durable. A desideratum of such valves is that the cover or disk be self aligning and self cleaning.

An object of this invention is to provide a valve requiring no packing, which may be constructed of stamped metal thereby eliminating expensive machining operations and which otherwise meets the above requirements.

The preferred embodiment of the valve shown herein includes a valve cover firmly attached to a stem which screws up and down. Such valves are often opened by the water eddys. Another object of this invention is to provide a resiliently expansible stem at the threads. To this end I split the stem axially.

Figure 1:
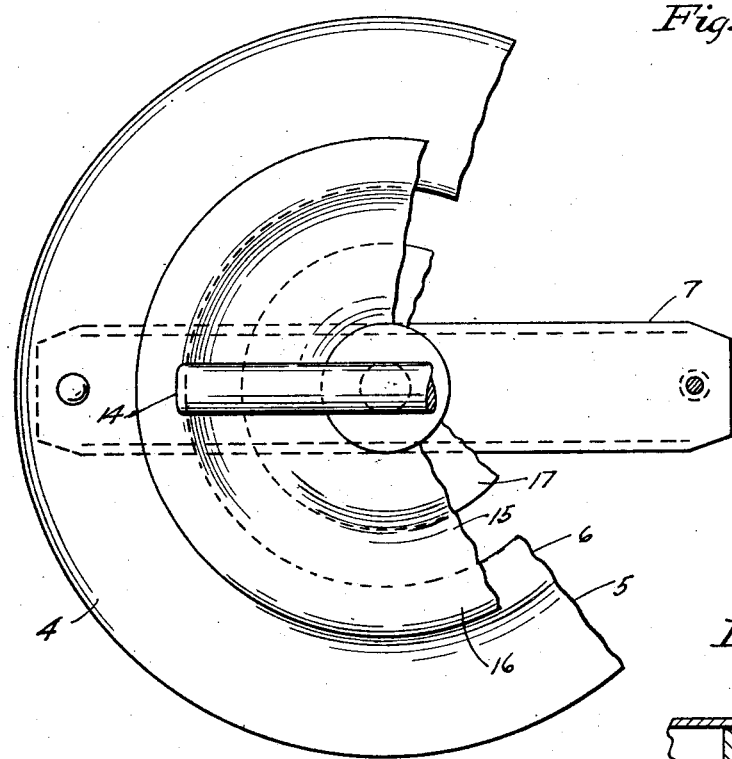
Figure 3:
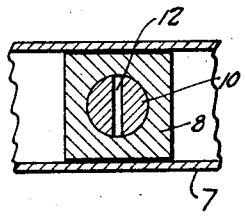
Figure 2:
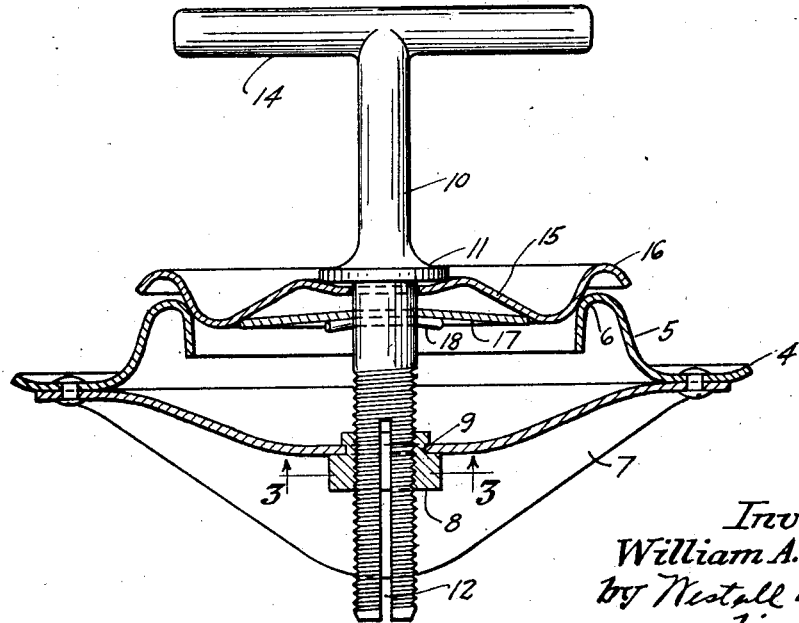

These objects together with other objects and corresponding accomplishments are obtained by means of the embodiment of my invention illustrated in the accompanying drawing, in which:

Fig. 1 is a plan view of a valve, parts being broken out to more fully illustrate the structure; Fig. 2 is a vertical section through the valve; and Fig. 3 is an enlarged view as seen on the line 3—3 of Fig. 2.

Referring more particularly to the drawing, 4 indicates a base which is preferably formed of stamped resilient metal with a raised portion 5 ending in a bead 6 at the port opening. The bead forms a seat for the valve cover. Spanning the port opening and secured to the base on the lower side thereof is a bracket 7 of channel form having an opening at the center thereof in which is mounted a nut 8 to receive the valve stem. The nut 8 has a collar portion 9 extending through the opening in bracket 7 so as to hold the nut in position.

Engaged with the nut 8 is a valve stem 10 having a collar 11. The lower end of the stem is enlarged in diameter and threaded. A slit 12 therein provides for a resilient expansion of the stem so as to maintain a tight fit between the threads in the nut 8 and those on the stem. The upper end of the stem is provided with a handle 14 for turning the stem to screw the latter upwardly or downwardly as desired.

The valve cover 15 is dished and formed with an annular bead 16 at the outer edge. The cover and base are so designed that the cover will contact the base along a line which is within the port opening. Collar 11 rests at its edges upon the cover and a spring washer 17 is mounted over the stem below the cover so as to be pressed thereagainst. A pin 18 extends through the stem and holds the washer 17 in position.

The cover is so arranged that upon screwing the stem 10 downwardly, it will engage the bead 6, slide downwardly to wipe the seat, then tightly engage the latter and be stopped from further downward movement at the edges. Further movement of the stem downwardly will press the collar downwardly against the center of the dished portion of the cover tending to straighten the bulge and thereby expand the cover laterally against the seat. The resiliency of the cover and seat will take care of any inequalities in alignment. Pressure of the collar upon the cover due to the slight reverse dishing of the cover at the center will provide a water tight fit between the stem and cover. The washer 17 prevents foreign matter, such as sand, dirt, or grit getting between the stem and cover and thereby wearing and interfering with the tightness of the joint. The spring of the cover assists in opening the valve.

It is obvious that I have provided a valve having few parts, which may be stamped from sheet metal and easily assembled. It is also obvious that the cover will tightly close the port under the usual operating conditions. The stem maintains the cover in adjusted position.

What I claim is:

1. A valve comprising in combination a base having a port opening bordered by a raised seat, a valve cover of resilient sheet metal having a beaded outer flaring portion so arranged that the outer side of said bead will contact the inner side of said seat and slide thereon, said cover being dished so as to be expanded upon pressure downwardly upon the dished portion, a reversely dished portion at the center of said cover, a stem having a metal collar seating within the outer margin of said reversely dished portion in line contact metal to metal, a bracket mounted on the under side of said base and spanning said port opening, a nut secured to said bracket, said stem being engaged by threads with said bracket so as to move said cover to and from its seat.

2. A valve comprising in combination a base having a port opening bordered by a raised seat, a valve cover of resilient metal having a flaring outer portion so arranged that the outer side of said cover will contact the inner side of said seat and slide thereon, said cover being dished so as to be expanded upon pressure downwardly upon the dished portion, a reversely dished portion at the center of said cover, and a stem having a metal collar resting within the outer margin of said reversely dished portion in line contact metal to metal, said stem being engaged with said base by threads so as to move said cover to and from its seat.

3. A valve comprising in combination a base having a port opening bordered by a raised seat, a valve cover of resilient metal having a flaring outer portion so arranged that the outer side of said cover will contact the inner side of said seat and slide thereon, said cover being dished so as to be expanded upon pressure downwardly upon the dished portion, a reversely dished portion at the center of said cover, and a stem having a metal collar disposed within the reversely dished portion and resting within the outer margin thereof in line contact metal to metal, said stem being engaged with said cover so as to move said cover to and from its seat.

In witness that I claim the foregoing I have hereunto subscribed my name this 30 day of July, 1923.

WILLIAM A. WATERMAN.